US009142833B2

(12) United States Patent
Tolbert et al.

(10) Patent No.: US 9,142,833 B2
(45) Date of Patent: Sep. 22, 2015

(54) LITHIUM ION BATTERIES BASED ON NANOPOROUS SILICON

(75) Inventors: Sarah H. Tolbert, Encino, CA (US); Eric J. Nemanick, Santa Monica, CA (US); Chris Byung-Hwa Kang, Cypress, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 181 days.

(21) Appl. No.: 13/702,990
(22) PCT Filed: Jun. 7, 2011
(86) PCT No.: PCT/US2011/039513
§ 371 (c)(1),
(2), (4) Date: Dec. 7, 2012
(87) PCT Pub. No.: WO2011/156419
PCT Pub. Date: Dec. 15, 2011

(65) Prior Publication Data
US 2013/0078508 A1 Mar. 28, 2013

Related U.S. Application Data
(60) Provisional application No. 61/352,263, filed on Jun. 7, 2010.

(51) Int. Cl.
*H01M 4/38* (2006.01)
*H01M 4/134* (2010.01)
(Continued)

(52) U.S. Cl.
CPC .............. *H01M 4/134* (2013.01); *H01M 4/38* (2013.01); *H01M 4/386* (2013.01); *H01M 4/625* (2013.01);
(Continued)

(58) Field of Classification Search
CPC ... H01M 6/185; H01M 4/134; H01M 4/1395; H01M 4/386
See application file for complete search history.

(56) References Cited

U.S. PATENT DOCUMENTS 6,287,720 B1 * 9/2001 Yamashita et al. ............ 429/131
2007/0154805 A1 7/2007 Zaghih et al.
(Continued)

FOREIGN PATENT DOCUMENTS

EP 0 709 907 A1 5/1996

OTHER PUBLICATIONS

Mi-Hee Park et al, "Silicon Nanotube Battery Anodes" Nano Letters vol. 9, No. 11, pp. 3844-3847 (2009).*
(Continued)

*Primary Examiner* — Ula C Ruddock
*Assistant Examiner* — Scott J Chmielecki
(74) *Attorney, Agent, or Firm* — Vista IP Law Group LLP

(57) ABSTRACT

A lithium ion battery that incorporates an anode formed from a Group IV semiconductor material such as porous silicon is disclosed. The battery includes a cathode, and an anode comprising porous silicon. In some embodiments, the anode is present in the form of a nanowire, a film, or a powder, the porous silicon having a pore diameters within the range between 2 nm and 100 nm and an average wall thickness of within the range between 1 nm and 100 nm. The lithium ion battery further includes, in some embodiments, a non-aqueous lithium containing electrolyte. Lithium ion batteries incorporating a porous silicon anode demonstrate have high, stable lithium alloying capacity over many cycles.

9 Claims, 18 Drawing Sheets

(51) Int. Cl.
*H01M 4/62* (2006.01)
*H01M 10/0525* (2010.01)
*H01M 10/0561* (2010.01)
*B82Y 30/00* (2011.01)

(52) U.S. Cl.
CPC ...... *H01M 10/0525* (2013.01); *H01M 10/0561* (2013.01); *B82Y 30/00* (2013.01); *Y02E 60/122* (2013.01)

(56) References Cited

U.S. PATENT DOCUMENTS

| | | | |
|---|---|---|---|
| 2007/0218333 A1* | 9/2007 | Iwamoto | 429/30 |
| 2009/0155676 A1 | 6/2009 | Zhamu et al. | |
| 2009/0169996 A1 | 7/2009 | Zhamu et al. | |
| 2009/0186267 A1* | 7/2009 | Tiegs | 429/129 |
| 2009/0256134 A1* | 10/2009 | Buchine et al. | 257/9 |
| 2009/0305135 A1 | 12/2009 | Shi et al. | |
| 2012/0156556 A1* | 6/2012 | Kuriki et al. | 429/199 |
| 2013/0078513 A1* | 3/2013 | Nathan | 429/211 |
| 2013/0115512 A1* | 5/2013 | Jiang et al. | 429/211 |

OTHER PUBLICATIONS

Hyesun Kim and Jaephil Cho, "Superior Lithium Electrolyte Meoporous Si@Carbon Core-Shell Nanowires for Lithium Battery Anode Material" Nano Letters vol. 8, No. 11, pp. 3688-3691 (2008).*
sciencewatch.com, Mesoporous Materials, available at http://archive.sciencewatch.com/ana/st/mes-mat/.*
PCT International Preliminary Report on Patentability (Chapter I of the Patent Cooperation Treaty) for PCT/US2011/039513, Applicant: The Regents of the University of California, Form PCT/IB/326 and 373, dated Dec. 20, 2013 (8pages).
Graetz, J. et al., Highly Reversible Lithium Storage in Nanostructured Silicon, Electrochem. Solid-State Lett. 6, A194-197 (2003).
Green, M. et al., Structured Silicon Anodes for Lithium Battery Applications, J.S., Electrochem. Solid-State Lett. 6, A75-A79 (2003).
Lehmann, V., The Physics of Macropore Formation in Low Doped n-Type Silicone, J. Electrochem. Soc. 140, 10, 2836-2843 (Oct. 1993).
Maranchi, J.P. et al., Interfacial Properties of the a-Si/Cu:Active-Inactive Thin-Film Anode System for Lithium-Ion Batteries, J. Electrochem. Soc., 153 (6) A1246-A1256 (2006).
Chan, Candace K. et al., High-performance lithium battery anodes using silicon nanowires, nature nanotechnology, vol. 3, Jan. 2008, www.nature.com/naturenanotechnology.
Esmanski, Alexei et al., Silicon Inverse-Opal-Based Macroporous Materials as Negative Electrodes for Lithium Ion Batteries, Adv. Funct. Mater., 2009, 19, 1999-2010.
Foll, H. et al., Formation and application of porous silicon, Materials Science and Engineering R 39 (2002) 93-141.
Granitzer, P. et al., Self-assembled mesoporous silicon in the crossover between irregular and regular arrangement applicable for Ni filling, Physica E 38 (2007) 205-210.
Hochbaum, Allon I. et al., Single Crystalline Mesoporous Silicon Nanowires, Nano Letters, 2009, vol. 9, No. 10, 3550-3554.
Huang, Rui et al., Carbon-coated silicon nanowire array films for high-performance lithium-ion battery anodes, Appl. Phys. Lett., 95, 133119 (2009).
Kim, Hyunjung et al., Three-Dimensional Porous Silicon Particles for Use in High-Performance Lithium Secondary Batteries, Angew. Chem. Int. Ed. 2008, 47, 10151-10154.
Lehmann, V. et al., On the morphology and the electrochemical formation mechanism of mesoporous silicon, Materials Science Engineering B69-70 (2000) 11-22.
Liu, Wei-Ren et al., Effect of electrode structure on performance of Si anode in Li-ion batteries: Si particle size and conductive additive, Journal of Power Source 140 (2005) 139-144.
Magasinski, A. et al., High-performance lithium-ion anodes using a hierarchical bottom-up approach, Nature Materials, vol. 9, Apr. 2010, www.nature.com/naturematerials, 353-359.
Peng, Kuiqing et al., Silicon nanowires for rechargeable lithium-ion battery anodes, Applied Physics Letters 93, 03310 (2008).
Richman, Erik K. et al., Ordered Mesoporous Silicon through Magnesium Reduction of Polymer Templated Silica Thin Films, Nano Letters, 2008, vol. 8, No. 9, 3075-3079.
Ruffo, Riccardo et al., Impedance Analysis of Silicon Nanowire Lithium Ion Battery Anodes, J. Phys. Chem. C 2009, 113, 11390-11398.
PCT International Search Report for PCT/US2011/039513, Applicant: The Regents of the University of California, Form PCT/ISA/210 and 220, dated Feb. 9, 2012 (5pages).
PCT Written Opinion of the International Search Authority for PCT/US2011/039513, Applicant: The Regents of the University of California, Form PCT/ISA/237, dated Feb. 9, 2012 (6pages).

* cited by examiner

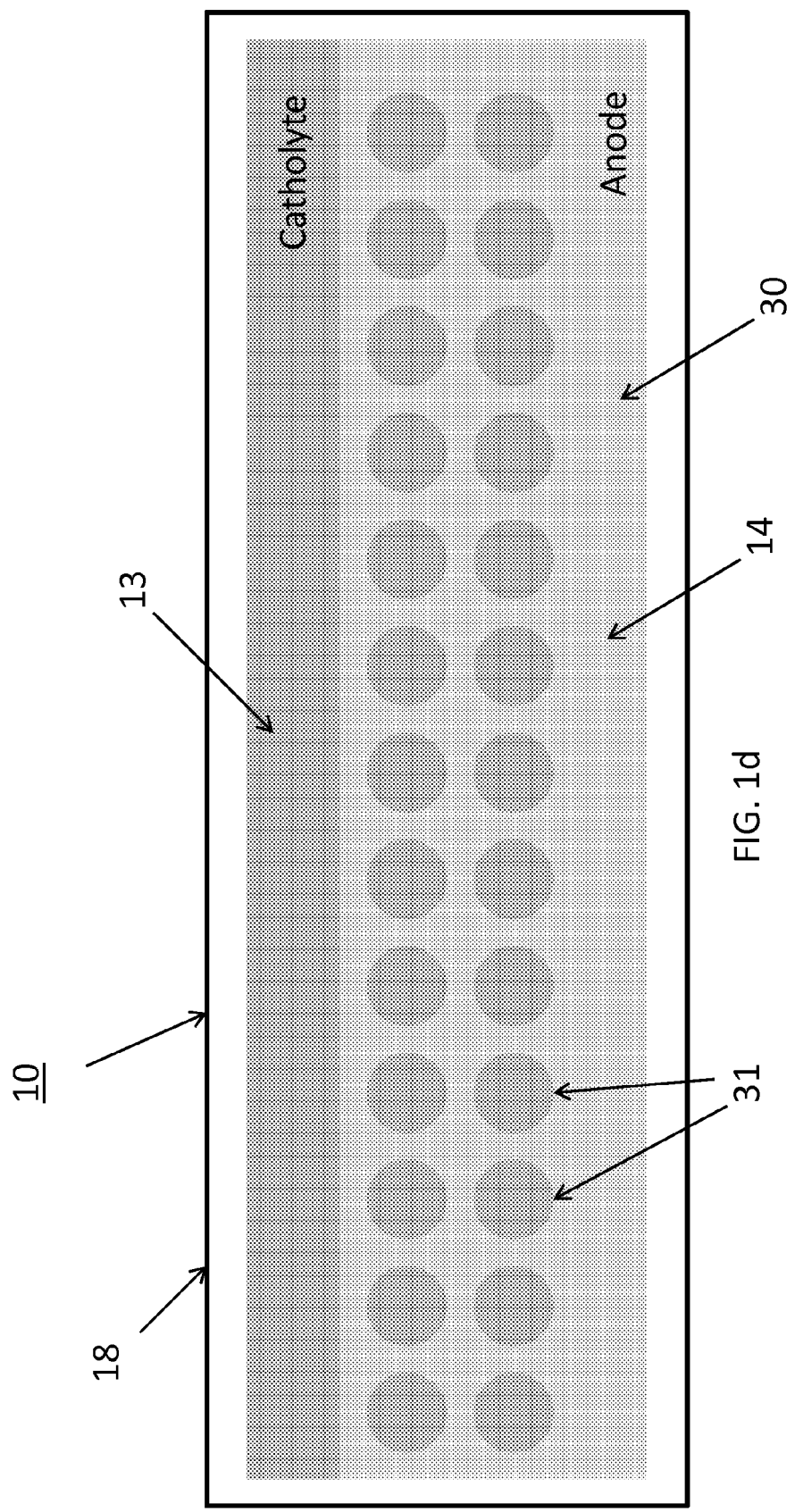

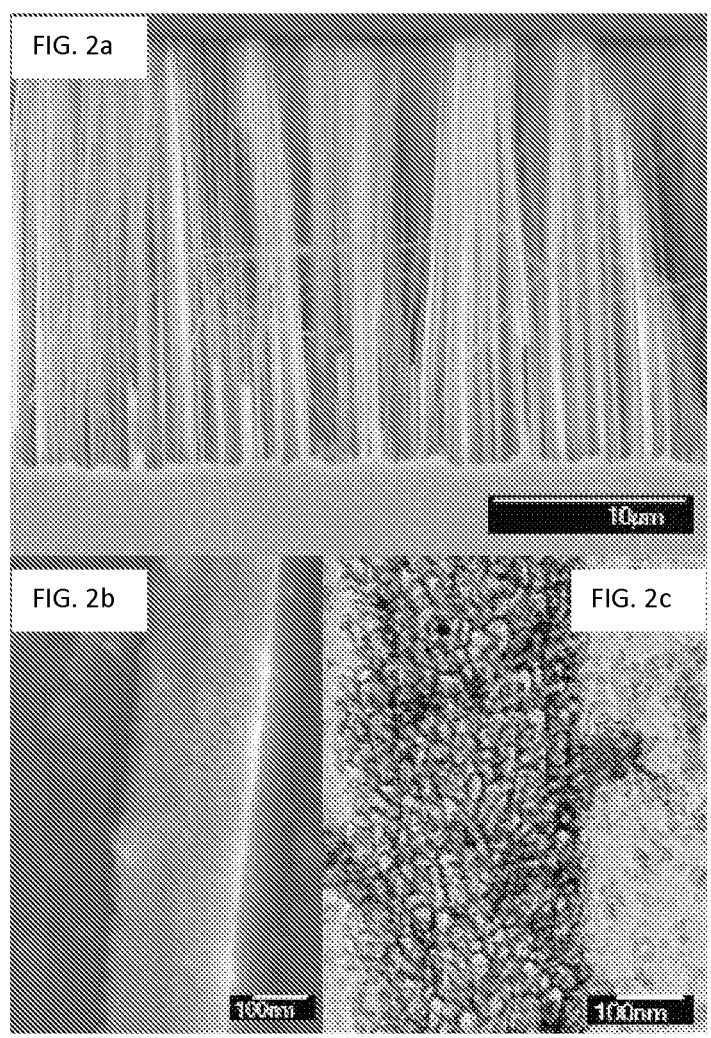

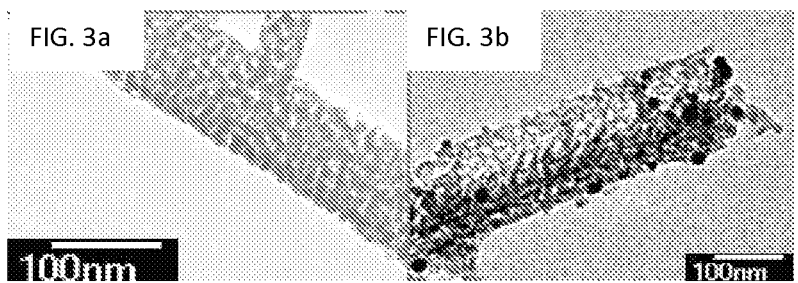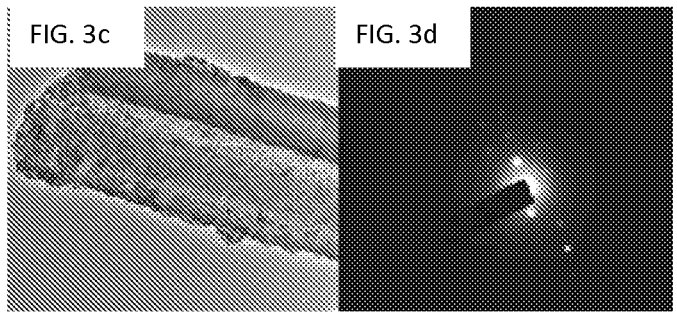

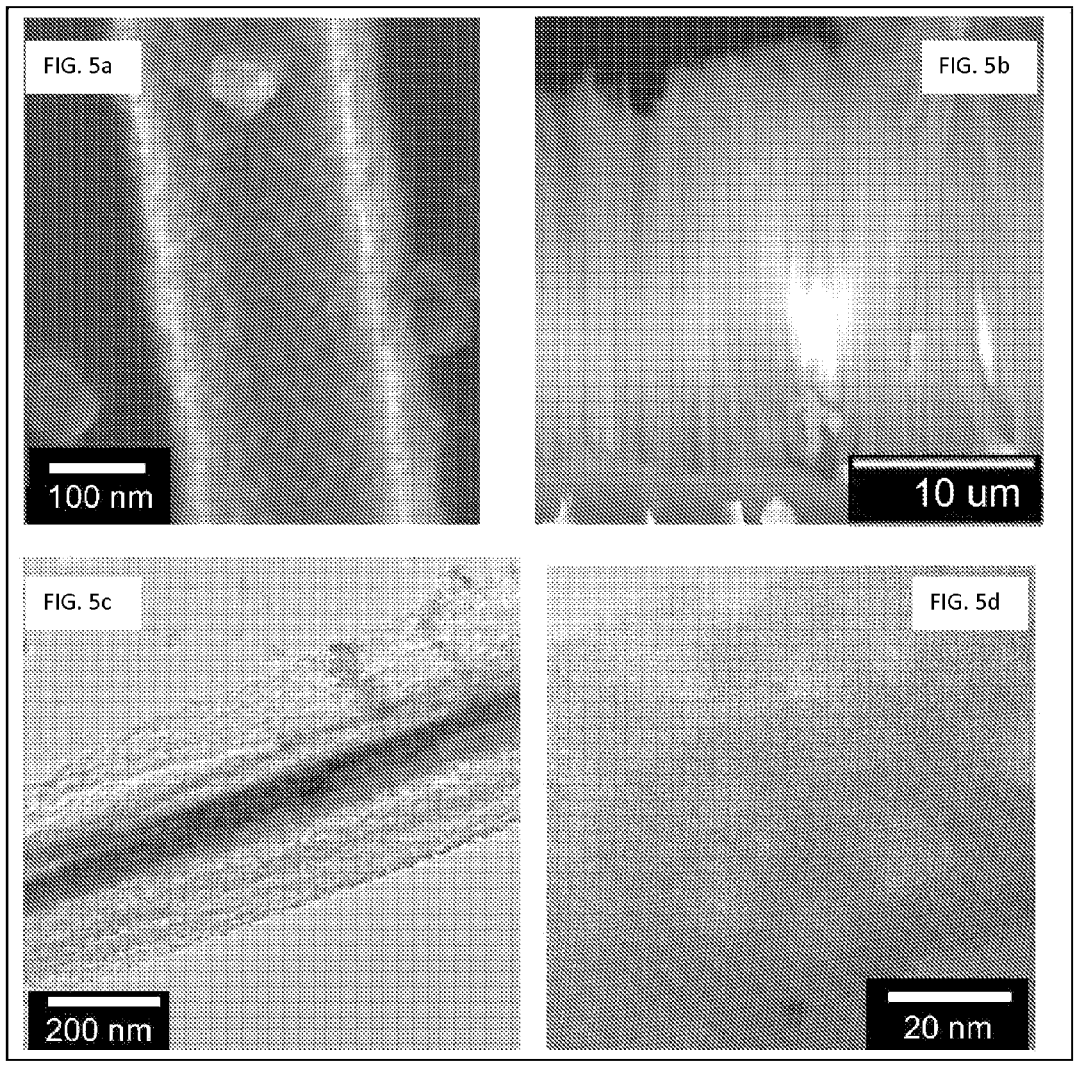

LITHIUM ION BATTERIES BASED ON NANOPOROUS SILICON

RELATED APPLICATION

This Application is a U.S. National Stage filing under 35 U.S.C. §371 of International Application No. PCT/US2011/039513, filed Jun. 7, 2011 which claims priority to U.S. Provisional Patent Application No. 61/352,263 filed on Jun. 7, 2010. The contents of the aforementioned applications are hereby incorporated herein by reference in their entirely. Priority to the aforementioned applications are hereby expressly claimed in accordance with 35 U.S.C. §§119, 120, 365 and 371 and any other applicable statutes.

STATEMENT REGARDING FEDERALLY SPONSORED RESEARCH AND DEVELOPMENT

This invention was made with Government support under HR0011-06-1-0048 awarded by the United States Department of Defense, Defense Advanced Research Projects Agency, N66001-10-1-4007 awarded by the United States Space and Naval Warfare Systems Command, and DE-SC0001342 awarded by the United States Department of Energy. The Government has certain rights in the invention.

FIELD OF THE INVENTION

The field of the invention generally relates to lithium ion batteries and, in particular, lithium ion batteries based on nanoporous silicon.

BACKGROUND OF THE INVENTION

Lithium-ion ($Li^+$) secondary or rechargeable batteries are now the most widely used secondary battery systems for portable electronic devices. However, the growth in power and energy densities for lithium ion battery technology has stagnated in recent years as materials that exhibit both high capacities and safe, stable cycling have been slow to be developed. Much of the current research effort for the next generation of higher energy capacity materials has revolved around using small or nanoparticulate active material bound together with conductive agents and carbonaceous binders. These additives, though, dilute high capacity materials with a much lower or non-active material and limit the ultimate charge storage capacity of any battery incorporating such materials.

There is a current and growing need for higher power and energy density battery systems. The power requirements for small scale devices such as microelectromechanical systems (MEMS), small dimensional sensor systems, and integrated on-chip microelectronics exceed the power densities of current $Li^+$ based energy storage systems. Power densities of at least 1 $J/mm^2$ are desired for effective function for such systems, and current energy densities for $Li^+$ thin film battery systems are about 0.02 $J/mm^2$. Three dimensional architectures for battery design can improve the areal power density of $Li^+$ secondary batteries by packing more active material per unit area without employing thicker films that are subject to excessive cycling fatigue. Three dimensional Lithium-ion battery architectures also increase lithium ion diffusion by maximizing the surface area to volume ratio and by reducing diffusion lengths.

The current state-of-the-art for anode electrodes in lithium ion batteries includes the use of high surface area carbon materials such as mesocarbon microbeads (MCMB). However, the capacity of any graphitic carbon, carbon black, or other carbonaceous material is limited to a theoretical maximum of 372 mAh/g and about 300 mAh/g in practice because carbon electrodes are usually formed of carbon particles mixed with a polymeric binder pressed together to form a bulk electrode. To store charge, $Li^+$ intercalates between the planes of $sp^2$ carbon atoms and this $C-Li^+-C$ moiety is reduced. In addition, the maximum number of $Li^+$ that can be stored is one per every six carbon atoms—$LiC_6$. While the capacity of graphitic carbon is not terribly high, the intercalation process preserves the crystal structure of the graphitic carbon, and so cycle life can be very good.

A more recent and promising option for anode materials is silicon (Si). In contrast to the intercalative charge storage observed in graphite, Si forms an alloy with lithium. Silicon-based negative electrodes are attractive because their high theoretical specific capacity of ~4200 mAh/g, which far exceeds than that of carbon, and is second only to pure Li metal. This high capacity comes from the conversion of the Si electrode to a lithium silicide which at its maximum capacity has a formula of $Li_{22}Si_6$, storing over 25 times more Li per atom than carbon. The large influx of atoms upon alloying, however, causes volumetric expansion of the Si electrode by over 400%. This expansion causes strain in the electrode, and this strain is released by formation of fractures and eventual electrode failure. Repeated cycling between $Li_xSi_y$ and Si thus causes crumbling of the electrode and loss of interconnectivity of the material. For example, 1 $\mu$m thick Si film anodes have short cyclability windows, with a precipitously capacity drop after only 20 cycles.

This strain from volumetric expansion has been mitigated, to some extent, by nanostructuring the anode material, providing room for material expansion. Nanostructuring Si films to reduce stress from lithium alloying has improved reversible capacity, though declines are still observed after 50 cycles. Going from a 2D Si electrode to 1D structures such as wires or an ensemble of 0D nanoparticles has been shown to further extend the cycle life of Si electrodes. Nanostructured materials for $Li^+$ charge storage have demonstrated improved cycling lifetimes, larger specific capacities, and higher sustainable charge rates compared to bulk or thin film versions of the same materials. These improvements arise because nanoscale materials have free space to accommodate volume expansion and shorter diffusion lengths.

Thin Si films (400-500 nm) have also shown more stable charge storage capacity because fracturing of the film upon cycling can in some cases result in interconnected nanostructures with many of the desirable properties described above. Silicon electrodes have further been made by dispersing Si nanowires or nanoparticles in a carbon binder or matrix. These types of electrodes have shown good stability out to 50 cycles, but relatively poor specific capacity of 600 mAh/g due to the inert mass of matrix. For example, Maqasinski et al. have disclosed a Si-based lithium ion anode that uses annealed carbon-black dendritic particles that are coated with Si nanoparticles. Maqasinski et al., Nature Materials 9, 353-358 (March 2010). These nanoparticles are then assembled into larger rigid spheres with open internal channels. While such structures have shown some improved reversible capacities, the inclusion of carbon adversely affects batter performance.

SUMMARY

In one embodiment, a lithium ion battery includes a cathode, an anode comprising a Group IV semiconductor material, the porous anode having pore diameters having a pore diameters within the range between 2 nm and 100 nm and an average wall thickness of within the range between 1 nm and 100 nm and a non-aqueous lithium containing electrolyte. For example, the porous anode may comprise porous silicon, germanium, or tin. The porous anode may include alloys and compounds containing the same.

In one embodiment of the invention, a lithium ion battery includes a cathode, an anode comprising a plurality of nanowires of porous silicon, the porous silicon having a pore diameters within the range between 2 nm and 100 nm and an average wall thickness of within the range between 1 nm and 100 nm, and a non-aqueous lithium containing electrolyte.

In another embodiment of the invention, a lithium ion battery includes a cathode, an anode comprising a film of porous silicon, the porous silicon having a pore diameters within the range between 2 nm and 100 nm and an average wall thickness of within the range between 1 nm and 100 nm, and a non-aqueous lithium containing electrolyte.

In another embodiment of the invention, a lithium ion battery includes a cathode, an anode that includes a powder of porous silicon, wherein the grains of the powder having pore diameters within the range between 2 nm and 100 nm and an average wall thickness within the range between 1 nm and 100 nm, and a non-aqueous lithium containing electrolyte.

In another embodiment, the lithium ion battery includes a porous anode comprising a Group IV semiconductor material, the porous anode having pore diameters having a pore diameters within the range between 2 nm and 100 nm and an average wall thickness of within the range between 1 nm and 100 nm and a catholyte surrounding the porous anode.

BRIEF DESCRIPTION OF THE DRAWINGS

FIG. 1d illustrates a lithium ion battery according to another embodiment that utilizes a porous silicon film immersed in a catholyte solution.

FIG. 2a illustrates a SEM cross section view of porous silicon nanowire arrays formed from the etching of p-Si in HF/Ag$^+$.

FIG. 2b is a magnified SEM view of a single porous silicon nanowire showing the thin pore walls and continuous nature of the nanowires.

FIG. 2c illustrates a TEM image of a single porous silicon nanowire showing pores and the 5-10 nm thick walls between the pores.

FIG. 3a illustrates a TEM image of porous silicon nanowires (before cycling) after formation and etching in 10% HNO$_3$ showing the porous nature of the wire.

FIG. 3b illustrates a TEM image of silicon nanowires (before cycling) without washing in HNO$_3$ showing the presence of Ag nanoparticles ranging in size from 3-15 nm in size on the surface. These nanoparticles cause the porosity of the wires by burrowing through them during wire formation.

FIG. 3c illustrates a TEM image of a single porous silicon nanowire.

FIG. 3d illustrates the corresponding SAED of the porous silicon nanowire of FIG. 3c showing the as-formed wires to be single crystalline.

FIG. 5a illustrates a SEM image of a single porous silicon nanowire after cycling 100× at 1 C.

FIG. 5b illustrates a SEM image of an array of porous silicon nanowires after cycling 100× at 1 C.

FIG. 5c illustrates a high resolution TEM image showing that porosity and a connected network are retained in the cycled porous silicon nanowires.

FIG. 5d illustrates a high resolution TEM image showing that porosity and a connected network are retained in the cycled porous silicon nanowires.

As seen in FIG. 9, the fact that the peaks remain after cycling means that the nanoscale architecture is preserved.

DETAILED DESCRIPTION OF THE ILLUSTRATED EMBODIMENTS

Figure 1A:
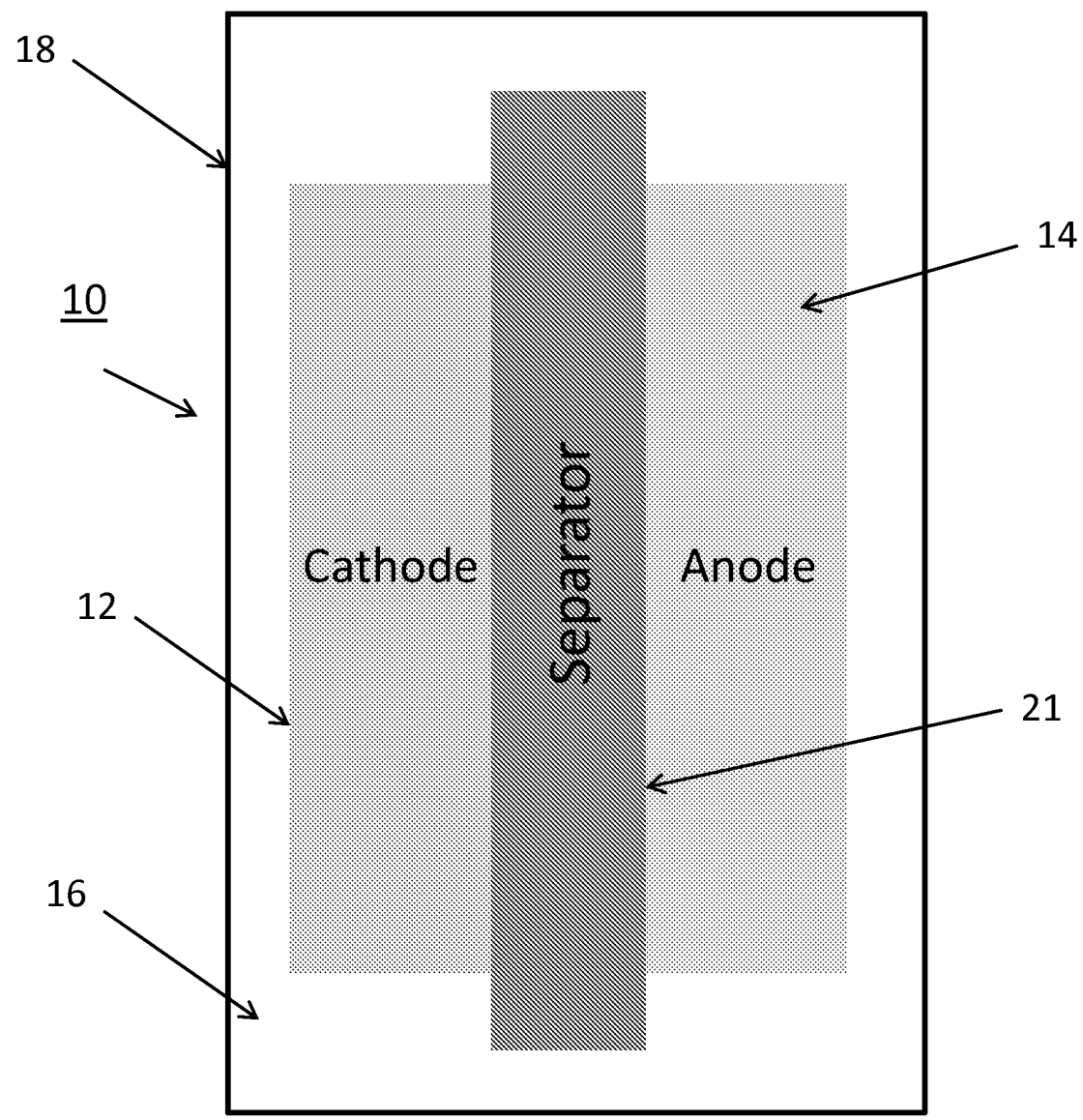
FIG. 1a illustrates a schematic representation of a lithium ion battery that utilizes a porous silicon anode, a separator, and a cathode.
Figure 1B:
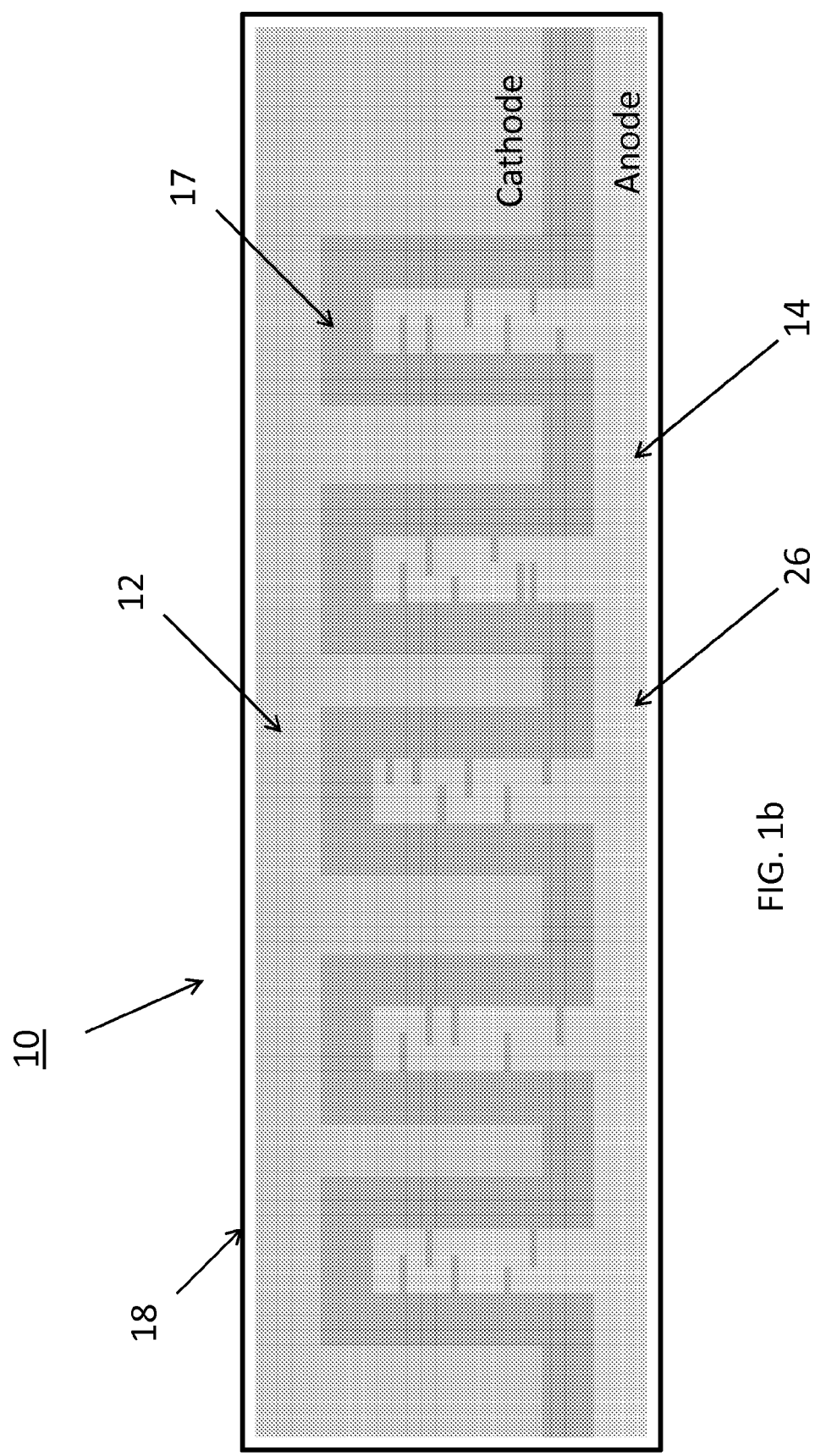
FIG. 1b illustrates a 3D lithium ion battery according to another embodiment that utilizes a porous silicon nanowire anode coated with solid electrolyte followed by a cathode.
Figure 1C:
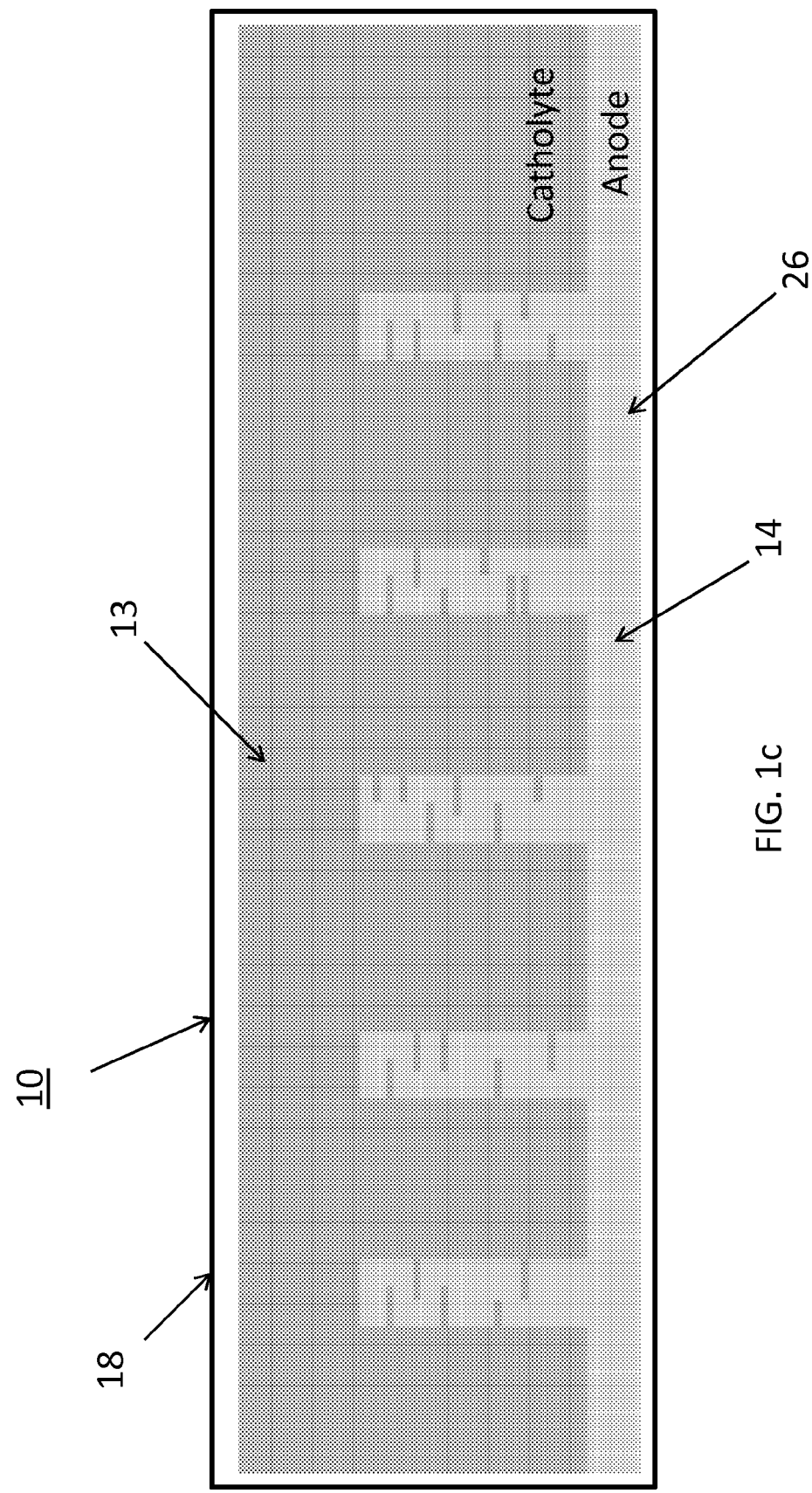
FIG. 1c illustrates a lithium ion battery according to another embodiment that utilizes a porous silicon nanowire immersed in a catholyte solution.

FIG. 1a schematically illustrates a lithium ion battery 10 according to one embodiment. The lithium ion battery 10 includes a cathode 12, and anode 14, an electrolyte 16, and a separator 21 disposed between the cathode 12 and the anode 14. The cathode 12, anode 14, separator 21, and electrolyte 16 are typically contained within a housing 18 or the like that seals the battery components from the external environment. The separator 21, in some instances, may include a porous structure through which liquid flows. In other embodiments, the separator 21 may include a solid, ion-conducting material. The separator 21 may be made of conventional materials. These include by way of illustration and not limitation, an inert porous material filled with liquid electrolyte, or it can be a solid-state electrolyte capable of transporting cations. In still other embodiments, such as those disclosed in FIGS. 1c, 1d, and 1e there is no need for a separator 21 given the presence of the catholyte 13. The cathode 12 of the lithium ion battery 10 may be made of conventional materials used in lithium ion batteries. These include, by way of example, $LiCoO_2$, $LiMn_2O_4$, $LiNiO_2$, $LiFePO_4$, $LiNiMnCoO_2$, $LiNiCoAlO_2$, Vanadium Pentoxide ($V_2O_5$), $LiS_2$, and $NaS_2$ The anode 14 of the lithium ion battery 10 is formed from, in one embodiment, porous silicon and may take on a number of physical geometries or constructs. For example, as explained more detail below, the anode 14 may include porous nanowires 24, porous films 30, or porous powders 40. In one embodiment, the anode 14 includes a plurality of porous silicon nanowires 24 that are formed as part of or on the anode 14. Such an embodiment is illustrated in FIGS. 1b and 1c. As used herein, the term nanowire refers to a generally filamentous structure having a substantially longer length compared to its diameter or width. An exemplary porous silicon nanowire 24 may have a length in the range of between 1 and 50 μm and a diameter of around 100 nm. Of course, the dimensions given above are merely illustrative and a nanowire may have lengths and/or diameters different than those specifically mentioned above. In some embodiments, the porous silicon nanowires 24 may be attached or otherwise secured to a base 26. For example, the base 26 may be formed from silicon or even some other non-silicon material. The base 26 may optionally be connected to or otherwise in electrical communication with a current collector (not shown). The current collector may include a metal or electrically conductive material. In another embodiment, the porous silicon nanowires 24 may be attached or secured directly to the current collector.

Generally, the porous silicon nanowires 24 form an array of the same on the anode 14. As formed, the array of porous silicon nanowires 24 are generally oriented perpendicular with respect to a base 26 as shown in FIGS. 1b and 1c. The porous wires can also be removed from the base and reattached to the current collector with random orientation. In this way, thicker films can be produced compared to those grown directly on the substrate. The porous silicon nanowires 24 are synthetically created by etching single crystal silicon. The porous silicon nanowires 24 form high, capacity, stable anode materials for Li ion alloying and charge storage. The porous silicon nanowires 24 are binder-free and form a high capacity anode 14 with 10× the gravimetric charge storage capacity (C/kg) and specific power (W/kg) compared to conventional carbon-based lithium ion batteries. In addition, because the porous silicon nanowires 24 are made by etching silicon wafers, this technology also has the potential to be integrated with other lithographically produced devices or circuits for on-chip charge storage.

The porous silicon nanowires 24 each contain pores throughout. The porous nature of the silicon in the nanowires enables the structure to undergo a large volume change upon lithium uptake and removal over a large number of charge/discharge cycles without physical damage to the anode 14. The porous silicon nanowires 24 are thus able to have high lithium alloying capacity over a large number of charge/discharge cycles. For example, in one aspect of the invention, the porous silicon nanowires 24 have a storage capacity greater than 2,000 mAh/g that is stable over one hundred (100) charge/discharge cycles. For example, charge capacities of approximately 2,300 mAh/g have been achieved over one hundred (100) charge/discharge cycles has been demonstrated using porous silicon nanowires 24. The porous silicon nanowires 24 show fast cycling with almost complete capacity retention up to 6 C (where a 1 C rate represents a one-hour complete charge or discharge) and reasonable retention at even higher rates.

The porous silicon nanowires 24 have pores located throughout the structure. Generally, the diameter of the pores within the porous silicon nanowire 24 fall within the range of 2 to 100 nm and more particularly, within the range of 2 nm to 50 nm. Adjacent pores within the porous silicon nanowire 24 are separated from each other by a wall of silicon. Generally, the average wall thickness in the porous silicon nanowires 24 falls within the range of 2 to 100 nm and more particularly, within the range of 2 nm to 50 nm. It has been found that if the wall is too thick, then the porous silicon nanowire 24 suffers from excess strain in the structure. Similarly, if the wall thickness is too thin, there is not enough structural integrity to the porous silicon nanowires 24. With regard to the pore size, if the pores are too large, too much volume is wasted which will add mass to the overall lithium ion battery because the pores must be filled with electrolyte. Generally, it best to have the smallest pore size in the porous silicon nanowires 24 that function.

The process of forming porous silicon nanowires 24 is similar to other processes for the etching of silicon and for forming silicon nanowires. In one embodiment, the oxidation (injection of holes) comes from the reduction of $Ag^+$ in solution to Ag(s) in the presence of the Si and $F^-$ to form the $(SiF_6)^{2-}$ ion. The Ag(s) is then redissolved in the HF solution, regenerating the $Ag^+$ and forming $H_2$. In other embodiments, the oxidant is peroxide or any other oxidant. The porous silicon nanowires 24 used in this work are a few hundred nm in diameter and up to 50 μm in length. These porous silicon nanowires 24 also have 5-10 nm pores within, and it is this porosity that allows for the stable cycling of these arrays as a lithium battery material.

As one illustrative process of forming porous silicon nanowires 24, silicon wafer pieces are first cleaned by sonication first in acetone and then followed by isopropyl alcohol. Immediately before immersion in the etching solution, the silicon substrates are also soaked in diluted hydrofluoric acid (HF 10:1). The etching bath may comprise an aqueous solution of 0.01-0.04 M $AgNO_3$ and 5 M HF, and the wafer is left to soak for 3-4 hours at 25-50° C. Upon removal from the etch bath, the loose film of dendritic Ag deposited on the top surface of the nanowires arrays is washed off by spraying with deionized water. The remaining Ag is dissolved by dipping the wafer pieces in concentrated nitric acid. The resulting arrays of porous silicon nanowires 24 were vertically oriented and comprised single crystalline nanowires covering approximately 40% of the wafer area. Additional details regarding the synthesis of porous silicon nanowires may be found in Hochbaum et al., Single Crystalline Mesoporouse Silicon Nanoletters, Nano Letters, Vol. 9, No. 10 3550-3554 (2009), which is incorporated by reference as if set forth fully herein.

The porous silicon nanowires 24 illustrated in FIG. 1a were fabricated from prime grade p-type (B) Si (100), resistivity 0.001-0.005 Ω·cm. Silicon samples were cut to 0.25 cm$^2$ and cleaned with acetone and 18 MΩ water. Samples were then immersed in 10 mL of 10% HF with 20 mM AgNO$_3$ at 60° C. for between 10 minutes to 3 hours. Samples immediately became encased in Ag and H$_2$ evolution was observed. After etching, the samples were washed in DI water. The covering of Ag was dissolved by immersion in concentrated HNO$_3$ (~30 s); samples were then rinsed and air dried. Before measurement, samples were etched in 48% HF for 30 s, rinsed in water, and dried under flowing N$_2$.

For a given etching condition, the porous silicon nanowires 24 had uniform lengths, with the length determined by the etch time. Arrays of porous silicon nanowires 24 were formed from 5 μm long to over 50 μm, and the wires formed at a rate of 13 μm/h. FIGS. 2b and 2c are SEM and TEM images of single porous silicon nanowires 24, showing the secondary porous structure of the wires. The nanowires have pores of 5-10 nm inner diameter, with pore walls having a thickness of 5-10 nm. TEM images were taken both before and after the acid washing so that the Ag nanoparticles could be imaged. Samples were prepared by sonicating arrays of porous silicon nanowire 24 in EtOH for 10 minutes to release the wires from the substrate; the resulting solution was then dropcast onto carbon TEM grids. Low resolution TEM was performed using a Philips CM120 at 120 kV and selected area diffraction (SAED) analysis was performed on a JEOL 2100 at 200 kV. For SEM, samples were imaged either after the nitric acid wash or after both acid washing and HF etching.

Samples were dried under flowing nitrogen and affixed to either a 45° stage by carbon tape or mechanically broken and imaged in cross section. For imaging of individual porous silicon nanowires 24, arrays were sonicated in EtOH for 10 minutes and the suspensions of porous silicon nanowires 24 was dropcast onto Si. Imaging was performed using a field emission SEM (JEOL 6700F). XRD was measured using a Panalytical XPert Pro diffractometer (Cu Kα).

FIGS. 3a and 3b illustrates TEMs of porous silicon nanowires 24 freed from the substrate, with FIG. 3a showing a fully washed porous silicon nanowire 24. A similar porous silicon nanowire 24 without removal of deposited Ag nanoparticles by washing with acid is illustrated in FIG. 3b and shows Ag nanoparticles on the surface as well as inside of the nanowire.

FIGS. 3c and 3d show TEMs of a single porous silicon nanowire 24 with the accompanying selected area electron diffraction (SAED) pattern indicating that the initial wires before cycling are crystalline, with only the (100) orientation being apparent. For materials such as silicon, which undergo a large volume change upon Li uptake and removal, it has been seen that the smallest dimension of the material, in this case the walls located between the pores, determines the maximum rate and cyclability of the material. The thin walls (e.g., 10-30 nm) between the pores of the porous silicon nanowire 24 allows for minimal strain upon alloying/dealloying while maintaining good conductivity. The mesoporous network also allows for short diffusion lengths, thus increasing the rate at which the arrays can be cycled.

Figure 4A:
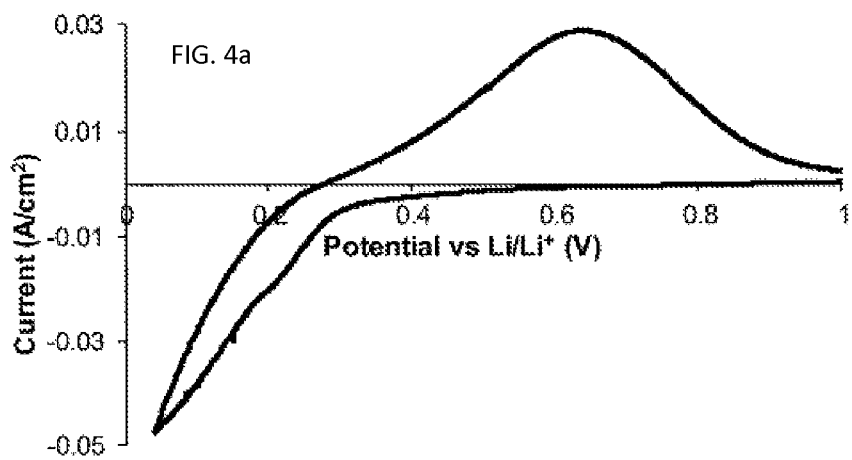
FIG. 4a illustrates the cyclic voltammogram of Li$^+$ alloying with porous silicon nanowires cycled at 1 mV/s. Reversible alloying of silicon with Li begins at 0.3 V and is not complete by 0.05V; subsequent extraction of Li shows a well-defined peak.
Figure 4B:
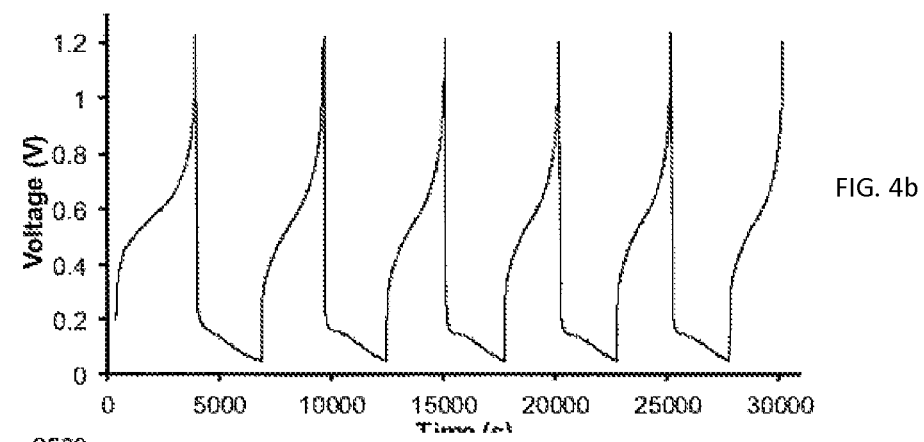
FIG. 4b illustrates a representative galvanostatic charge/discharge curves for porous silicon nanowire arrays cycled at 400 mA/cm$^2$.
Figure 4C:
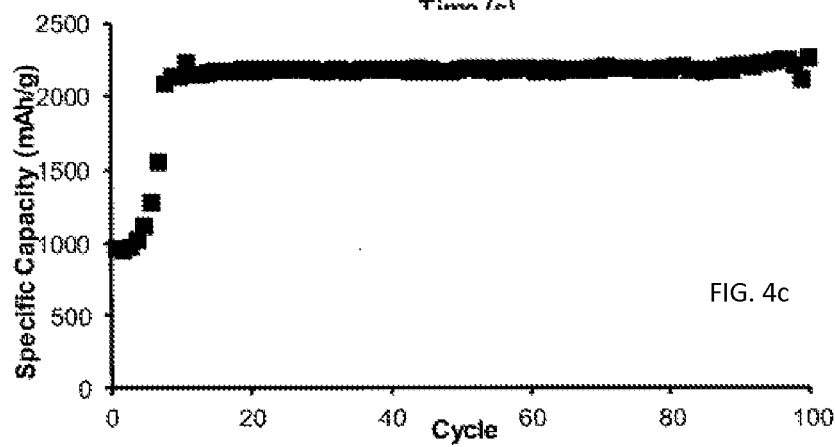
FIG. 4c illustrates the discharge capacity from a fixed charge. Samples were charged at 200 μA/cm$^2$ for 5000 s (1 C/cm$^2$), and discharged at the same rate/time. This charge limited cycling does not lithiate the substrate but instead favors the high surface area nanowires, allowing for determination of cycling characteristics of nanowires still affixed to the bulk Si substrate.
Figure 13:
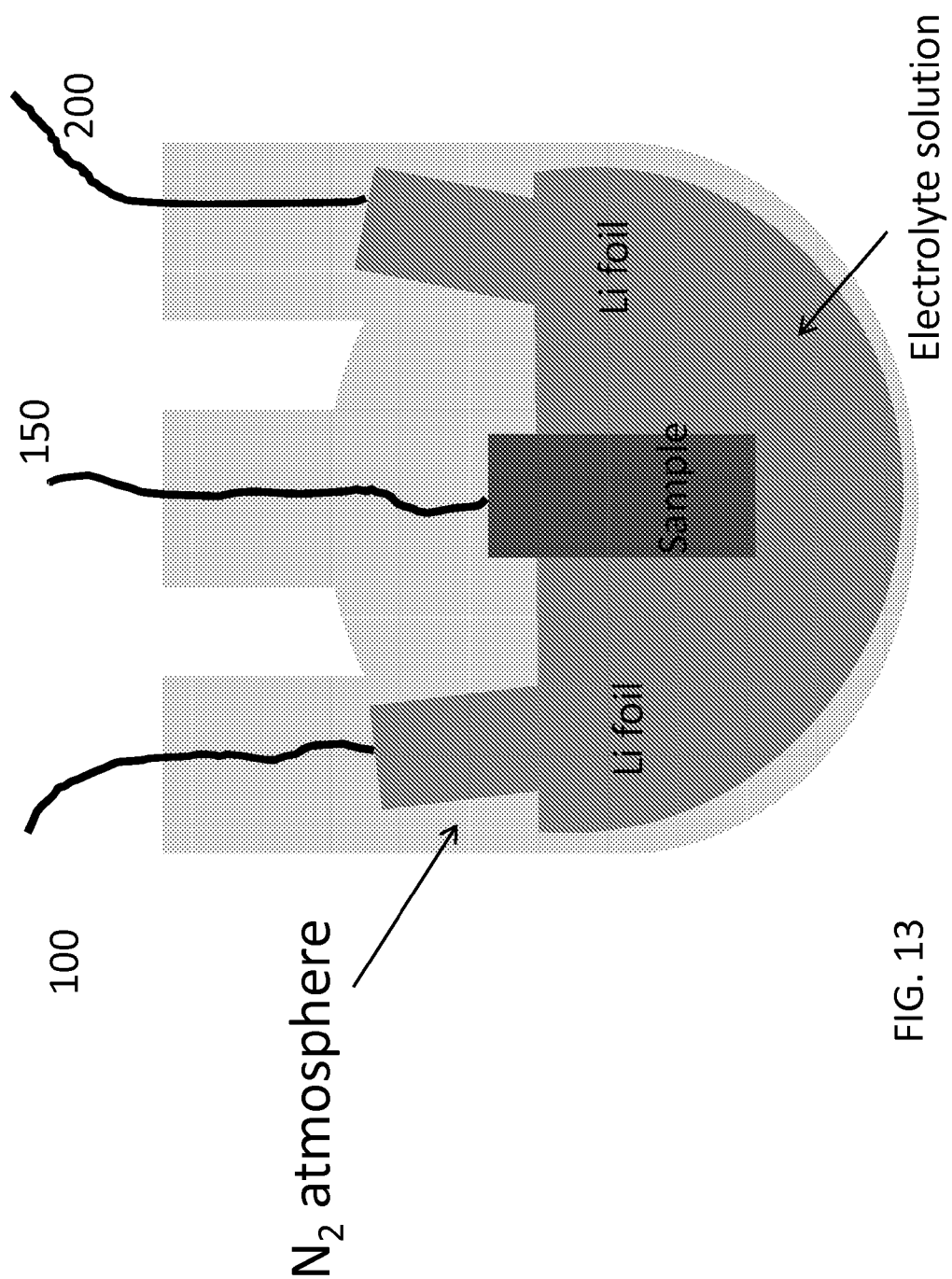
FIG. 13 illustrates a three electrode testing setup used to evaluate the lithium storage capacity of various porous anode structures.

FIGS. 4a-4c show the electrochemical characterization of the porous silicon nanowire 24 arrays in 1 M LiClO$_4$/PC. For Li alloying studies, a 0.25 cm$^2$ sample was used. The porous silicon nanowires 24 on one side were removed mechanically and electrical contact was made using Ga/In eutectic. A Cu wire was then affixed using Ag epoxy (Ted Pella Conductive Epoxy) and the Cu wire was sealed with an insulating epoxy (Loctite Hysol 1C, McMaster-Carr). The measurement cell was prepared and tested in a N$_2$ filled glovebox. The electrochemical properties of the sample were tested using a three electrode cell consisting of 15 mL of 1 M LiClO$_4$ in propylene carbonate as illustrated in FIG. 13. A 4 cm$^2$ Li foil counter electrode 200 and a 1 cm$^2$ Li foil reference electrode 100 were used in the cell with working electrode 150 and counter electrode 200 placed ~3 mm apart. Samples were cycled with a PAR 273 potentiostat, at rates from 0.7 C to 48 C. To measure the active sample mass without interference from the silicon substrate, samples were first charged to form Li$_x$Si$_y$. The sample was then removed from the glovebox and immediately plunged into a 25 mL solution of 5% HNO$_3$ and 0.1% HF, causing the Li$_x$Si$_y$ to react vigorously forming H$_2$ and SiF$_6^{2-}$. The sample was soaked for 30 s and then rinsed with the acid solution. The Si content of the solution was then analyzed using ICP-OES (Inductively Coupled Plasma—Optical Emission Spectrometer).

FIG. 4a illustrates the cyclic voltammetric characterization of an array of 20 μm long porous silicon nanowires 24 at 5 mV/s. Cycled between 1 V and 0.05 V vs. Li(s)/Li$^+$, the porous silicon nanowires 24 show a strong reductive/alloying peak beginning at ~0.3 V and increasing in magnitude down to 0.05 V, where the voltage polarization was reversed. As shown by the lack of a peak in the reductive current, the silicon does completely lithiate by 0.05 V at this charge rate. The full 4200 mAh capacity of the silicon nanowire in forming Li$_{22}$Si$_5$ cannot be reached at any potential positive enough to avoid lithium plating, so the arrays were not cycled to less than 0.05 V to avoid the electrodeposition of Li(s) in addition to the lithium silicide formation. The return oxidation peak from the dealloying reaction was broader than the reductive peak, with the Si nanowires beginning to release their Li at ~0.35 V, only 50 mV positive of the onset of the reductive peak, indicating a fast, kinetically facile discharge process.

The galvanostatic charging of a 20 μm long array of porous silicon nanowire 24 is shown in FIG. 4b, charging/discharging at 0.4 mA/cm$^2$. The representative galvanostatic charge/discharge curves for the porous silicon nanowires 24 mirror the cyclic voltammogram, with relatively well-defined regions of charge and discharge for the porous silicon nanowires 24, made even more distinct by the slower rate. The comparatively narrow reduction peak in the CV and the small potential range of the reduction plateau in the galvanostatic charge starting at ~0.2 V indicates that there was little kinetic overpotential for the lithiation of deeper sites, most likely due to the high surface area of the porous silicon nanowires 24. The hysteresis seen in the galvanostatic curves (~500 my separation between the reductive and oxidative plateaus) indicates that the energy storage/extraction process was reasonably efficient.

For this example, the porous silicon nanowires 24 are on a bulk silicon current collector. Because this substrate can also be lithiated, care must be taken to prevent this. This problem can be alleviated by charging the electrode with a constant number of coulombs that is insufficient to fully alloy the Si wires. The porous silicon nanowires 24, due to their high surface area and thin walls, are kinetically easier to alloy than the substrate, and so will react first. When the total charge is limited, only the wires will react. Alternatively, thin silicon can be used and the etching process can proceed through the entire material to produce silicon wires on a non-silicon base (e.g., base 26).

Here, samples were charged at 0.2 mA/cm$^2$ for 5000 s (1 C/cm$^2$), and discharged at the same rate/time. This permits the selective examination of the electrochemical performance of the porous silicon nanowire 24 without complication from the substrate. FIG. 4c shows capacity as a function of cycle number for 100 cycles. Initially, there is an increase in capacity which, it is believed, is associated with charge limited cycling and the irreversible conversion of slowly reacting crystalline Si to faster alloying amorphous Si. After this initial rise, however, there is no loss of total capacity up to 100 cycles and near unity efficiency of charge storage.

Using this charge limited technique, the mass of silicon involved can be measured by charging the electrode and then selectively dissolving the Li$_x$Si$_y$ in 5% HNO$_3$/0.1% HF. The silicon content in solution can then be evaluated by ICP-OES to find the mass of the active electrode. The data in FIG. 4c indicates a stable capacity of around 2300 mAh/g. This value is lower than the theoretical capacity of 4200 mAh/g because the charge limited technique does not allow the silicon to be fully lithiated.

Full lithiation requires a voltage near 0V vs. Li/Li$^+$, and this charge limited cycling stopped charging between 0.08 and 0.1 V. This measurement thus gives a lower bound for the specific capacity of these Si nanowire arrays. Analysis of the porous silicon nanowires 24 after Li alloying cycles enables one to understand the remarkably stable cycling of the anode 14 observed in FIG. 4c.

FIGS. 5a-5D illustrate the retention of individual porous silicon nanowires 24 after cycling 100 times at 1 C. FIG. 5a shows an SEM image of a single porous silicon nanowire 24 after cycling. While the sharp edges to the porosity seen in FIG. 2b have been rounded out, the porous silicon nanowire 24 still shows clearly defined nanoscale porosity with a length scale similar to that observed in the uncycled wires. Both the individual porous silicon nanowires 24 and the array in FIG. 5b show a lack of macroscopic fracturing, in contrast to observations of bulk Si materials. TEM analysis of the cycled wires (FIGS. 5c and 5d) further confirm the retention of porosity and indicate that pores are now surrounded by a continuous network of nanosized domains, rather than by the straight walls observed in the as-synthesized nanowires. The change is consistent with the conversion of the wire from crystalline Si, which should show well defined facets, to amorphous Si, which should prefer more spherical domains that minimize surface area. In agreement with this hypothesis, no Si diffraction could be observed in SAED. While the cycled nanowires appear somewhat more disordered than the initial pore structure, they remain porous and structurally intact after cycling, allowing for facile ion transport, good electrical conductivity, and strain minimization during cycling.

Figure 6:
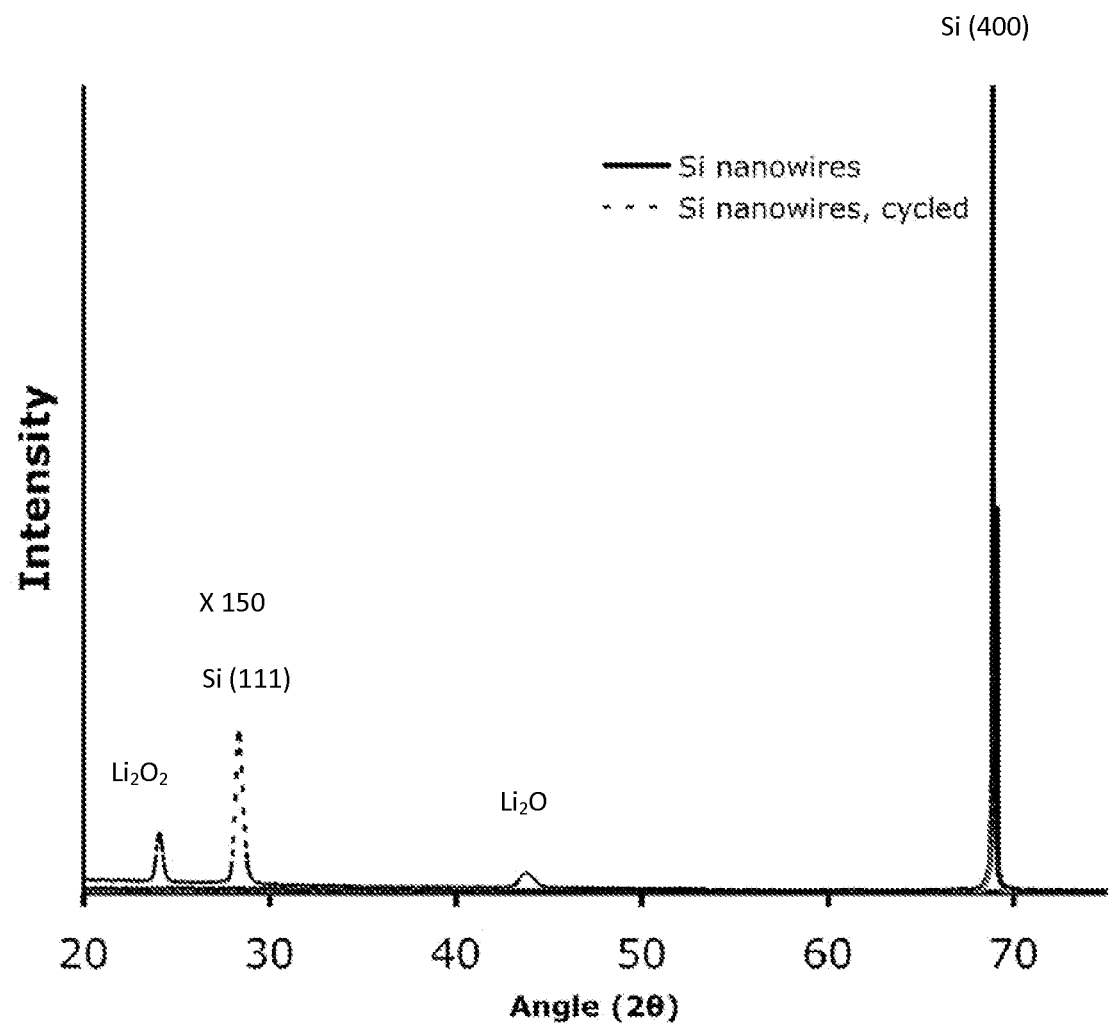
FIG. 6 illustrates the diffraction data showing the change in crystal structure of the porous silicon nanowire upon cycling (solid line is Si nanowires and dashed line is cycled Si nanowires). The as-synthesized porous silicon nanowire show only peaks from the (100) family, indicating that the nanowires maintain the crystallinity and orientation of the original Si substrate. The nanowires after cycling show some lithium oxide peaks, as well as the Si (111) peak. However, the low intensity of all peaks indicates that the nanowires are mostly amorphous after cycling.

FIG. 6 shows the XRD of the as-formed porous silicon nanowires 24 (solid line), showing only the (400) peak for the arrays, the same as the bulk single crystal Si wafer. After cycling (dotted line), there are very small peaks for Si (111), as well as some lithium oxide peaks from residual lithium in the porous silicon nanowires 24. The growth of the Si (111) peak indicates there that is was some recrystallization of the porous silicon nanowire 24 after cycling, but the very small size of this peak indicates that the cycled nanowires are mostly amorphous, in agreement with TEM studies.

Figure 7:
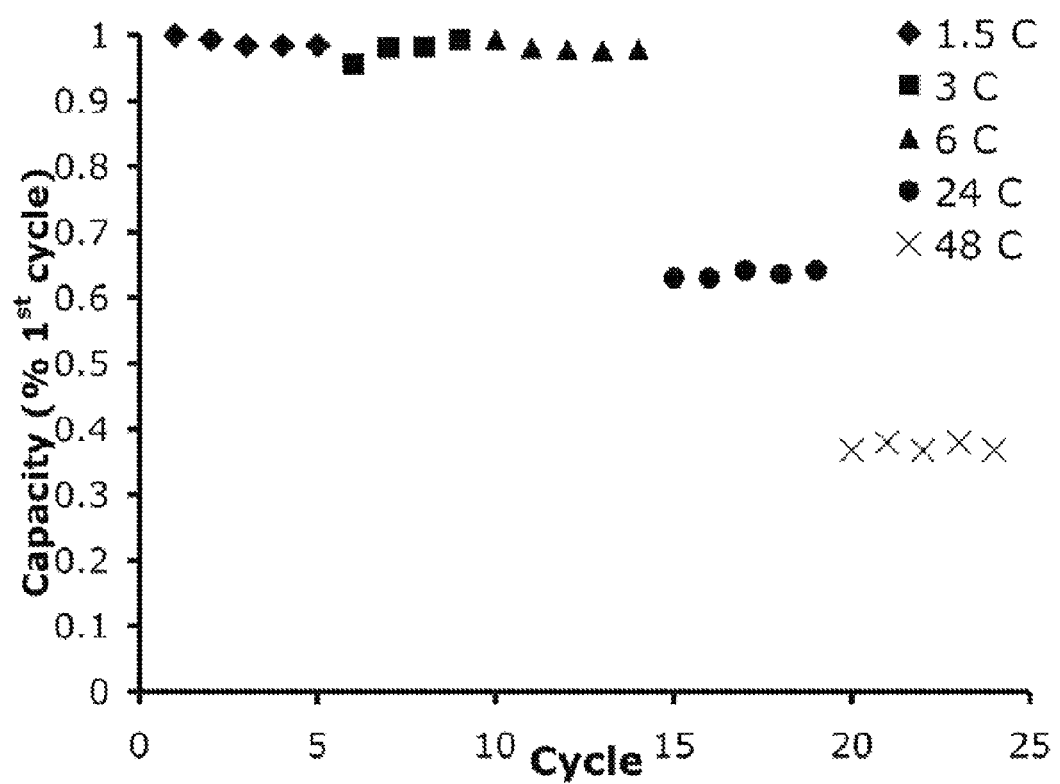
FIG. 7 illustrates a graph of porous silicon nanowire capacity as a function of number of cycles. In all cases, the 50 μm porous silicon nanowires were charged at 0.7 C for 5000 s (400 μA/cm$^2$) and then discharging at 1.5 C (diamond), 3 C (squares), 6 C (triangles), 24 C (circles), and 48 C (crosses). The nanowires were discharged up to 1.2 V. Little capacity fade is observed up to 6 C, and reasonable capacity retention is observed up to 48 C.

To demonstrate the speed at which the nanowire electrodes can be cycled, FIG. 7 illustrates the porous silicon nanowires 24 charged at 0.7 C for 5000 s (at 400 μA/cm$^2$) and discharged at increasing rates. This cycling shows a nearly constant discharge capacity up to 6 C. At much higher rates some decrease in capacity was observed with a 40% loss of capacity at 24 C and a 60% loss at 48 C. The high capacity retention at rates up to 6 C is likely due to the small dimensions of the walls of the porous silicon nanowire 24, which allow for fast movement of Li from the silicide to solution and facile strain relaxation. The falloff in capacity at higher rates was most likely dominated by limitations of the flooded cell three electrode experimental apparatus, rather than to limitation of the porous silicon nanowire 24 structure, and thus these values represent a lower limit on the high-rate capacity of these porous silicon nanowires 24.

The results show that porous silicon nanowires 24 can function as stable, high capacity anodes 14. Using a fixed charge approach and fractional charging to minimize the alloying of the silicon substrate, the porous silicon nanowires 24 showed a stable capacity of around 2300 mAh/g over one hundred (100) cycles. While the initially crystalline Si nanowires are converted to amorphous Si upon cycling, both the nanowire structure and the nanopores within the wires are well preserved after 100 cycles. The relatively fast cycling capacity and robustness of the porous silicon nanowires 24 compared to larger size Si structures such as films, dense wires, or nanoparticle aggregates makes these porous silicon nanowire 24 arrays and the porous nanowire structure in general an attractive option for high capacity lithium ion batteries. Because these porous silicon nanowires 24 are electrically conductive and attached to a conductive substrate, they do not require the use of an inert binder and so the specific capacity of electrodes can be much higher. Moreover, because the porous silicon nanowires 24 are intrinsically connected to a silicon substrate, they have exciting potential for integrated, on-chip power. Matching this high capacity anode material with a similarly high capacity cathode material could produce major strides in the field of high capacity/light weight power sources.

While FIG. 1a illustrates a generic or even "coin-cell" type lithium ion battery 10. Other cell geometries are also possible. For example, the nanoporous silicon nanowires 24 can form the basis for a three-dimensional microscale battery where the space between the nanoporous silicon nanowires 24 is filled with a cathode material. In this microscale battery, diffusion distances are short thus making the power density quite high.

FIG. 1b illustrates an embodiment of a lithium ion battery 10 in which the anode 14 is formed from porous silicon nanowires 24 that are oriented generally orthogonal or perpendicular to the base 26 and do not contact one another. This unbundling of the individual porous silicon nanowires 24 is accomplished by replacing water first with methanol and then with liquid carbon dioxide ($CO_2$), which is removed in the supercritical state. After the HF etch process, the silicon nanowires 24 are washed with water. The water is then exchanged with dry methanol. This methanol is then exchanged for liquid $CO_2$ which is heated and pressurized to create a supercritical fluid. The $CO_2$ is then cooled and depressurized directly to the vapor state, leaving the separate silicon nanowires 24 oriented generally orthogonal to the base 26.

In the unbundled arrangement, a solid electrolyte 17 is deposited over the porous silicon nanowires 24. As one example, an ion conductive polymer such as poly(ethylene oxide) (PEO) or poly(ethyleneglycol methacrylate) (polyPEGMA) may be deposited over the porous silicon nanowires 24 by using either solution phase surface grafting or plasma deposition. In the case of surface grafting, an initiator is bound to the silicon surface and then the polymer is grown off the silicon surface. For plasma polymerization, the nanowire array is exposed to a plasma containing a polymer precursor. Both methods produce fairly conformal electrolyte coatings. Alternatively, atomic layer deposition (ALD) may be used to put down an inorganic solid electrolyte such as lithium aluminosilicate. ALD is capable of coating individual nanowires 24 and even coating the pores of the nanowires 24. This is seen in FIG. 1b where the solid electrolyte 17 is illustrated as penetrating into the porous silicon anode 14. The lithium ion battery 10 in this embodiment is contained within a housing 18. After deposition of the electrolyte layer 17, the remaining pore space is filled with cathode material to form the complete three-dimensional lithium ion battery 10.

As explained herein, according to one embodiment, the anode 14 of the lithium ion battery 10 may be formed from a porous silicon film 30. The porous silicon film 30 may be disposed on a base 26 or directly formed on the current collector. In this embodiment, the porous silicon film 30 is created by the reduction of $SiO_2$ films by Mg vapor. The process begins with mesoporous silica ($SiO_2$) thin films that are produced via block copolymer templating using sol-gel silica. This results in a film with nanometer-sized pores. The silicon is produced through reduction of the silica thin films in a magnesium (Mg) vapor. The particular method is described in Richman et al., Ordered Mesoporous Silicon through Magnesium Reduction of Polymer Templated Silica Thin Films, NANO LETTERS Vol. 8, No. 9 3075-3079 (2008), which is incorporated by reference herein.

In one example, porous silicon film 30, the ordered structure was formed on stainless steel (type 304) or 99.994% Ni foil (Aldrich) for high capacity $Li^+$ alloying electrodes. These structures were templated using sols prepared by dissolving 40 mg of PIB-PEO (BASF), a micelle forming ambipolar polymer, in 2 mL of EtOH and stirred at 60° C. until dissolved, ~10 min. 500 mg of a silicon alkoxide, tetraethylorthosilicate (TEOS) was dissolved in 3 mL of EtOH. To this solution was added 400 mg of 18 MΩ water, followed by 200 mg of 0.1 M HCl and stirred. The two solutions are combined and stirred for 1 hour, and let rest overnight. Substrates with the size of 2 cm×3 cm were cleaned by washing with soapy water, followed by DI water, then EtOH and blown dry. Before use, the silica sol was passed through a 200 μm hydrophilic PTFE syringe filter to remove particulates, and the filtrate was diluted 2:1 in EtOH. Substrates were immersed into the sol and withdrawn at rates between 4-8 cm/min at humidity between 18-22%. After initial drying (~60 s) in the humidity controlled chamber, the films were dried for 1 hour at 80° C. It should be understood that while PIB-PEO is specifically described above as forming the ordered structure, other di-block copolymer systems may be used to form the porous silicon film 30. Other di-block copolymers that may be used include, without limitation, Poly(ethylene-alt-propylene)-block-(ethylene oxide) (PEP-PEO), poly(ethylene-co-butylene)-block-(ethylene oxide) (PLE-PEO), and Poly(butadiene)-block-(ethylene oxide) (PB-PEO). Mesoporous silica synthesis using these di-block copolymers and other related polymers are same as PIB-PEO. The only difference in the synthesis is quantity of di-block copolymers mixed into the sol.

Figure 8:
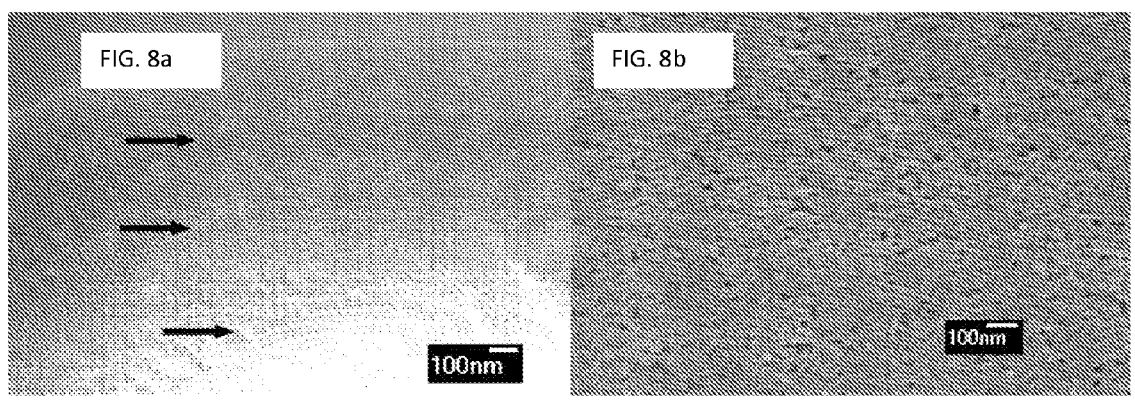
FIG. 8a is a SEM image of PIB-PEO SiO$_2$ after calcining to 450° C. These films were made with four coatings, and the interface between each layer is marked (arrows).
FIG. 8b is a top view of PEP-PEO Si film after Mg reduction, the polycrystalline Si grains formed interconnected cubic pores.

After depositing the sample on the substrate, samples were heated at rate of 1° C./min to 450° C. and held there for 7 hours to complete the cross linking of the TEOS into $SiO_2$ as well as to completely combust the PIB-PEO templating agent. This produced a film between 150-300 nm thick depending on the deposition conditions, whose morphology is seen in FIG. 8a. The PIB-PEO micelles have templated the $SiO_2$ into the negative space of a cubic packed structure. Thicker films were prepared by multiple dipcoatings in the sol with 1 hour drying intermissions at 60° C. between pulls. For the $Li^+$ alloying measurements herein, samples were pulled 4 times to create ~800 nm thick $SiO_2$ films.

For reduction of the porous silica films, substrates were reacted in an oven in a $N_2$ filled glove box. A 1 cm×2 cm portion of film was inserted into a stainless steel reaction chamber, which has an inner volume of 5 $cm^3$, and 5 mg of Mg powder was placed 1 cm away from the film. The chamber was heated to 675° C. in 2 hours and soaked for 5 hours. After cooling and removal from the reaction chamber, the film was immersed in 0.1M HCl for 30 s to remove residual MgO and then concentrated HF to remove any unreacted $SiO_2$. FIG. 8b shows the film structure after reduction, with the film composed of >10 nm polycrystalline Si grains forming cubic pores, ideal for $Li^+$ alloying because of the thin, sub 15 nm walls and interconnected architecture.

Figure 9:
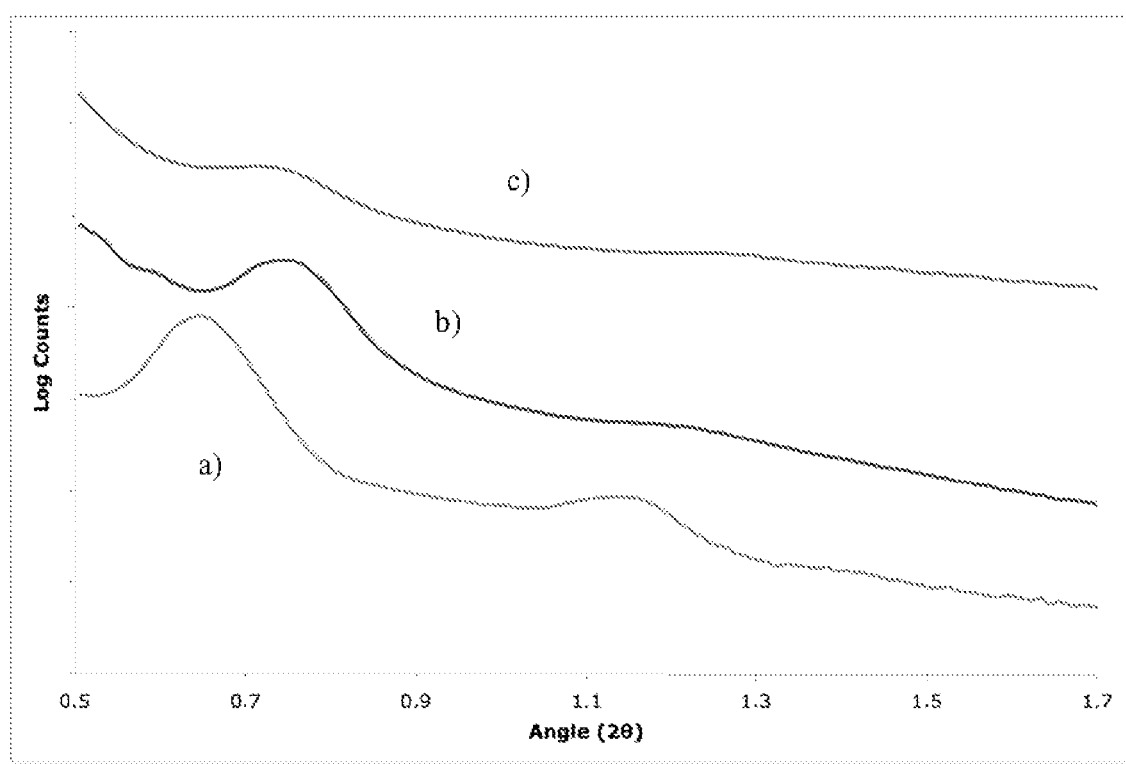
FIG. 9 shows a low angle X-ray diffraction of nanoporous silica, nanoporous silicon, and nanoporous silicon after recycling.

These $SiO_2$ templated films formed an ordered mesopore structure, as measured by low angle X-ray diffraction studies, of 13.5 nm diameter and pore wall thicknesses of >10 nm by SEM. After reduction, the order measured in the $SiO_2$ film by X-ray diffraction remains, as seen in FIG. 9, demonstrating that the mesopores have contracted slightly, to 12 nm going from $SiO_2$ to Si. The (a) line represents the low angle XRD showing film before magnesium reduction treatment, showing a peak at 0.65 2θ, corresponding to 13.5 nm. The (b) line is the low angle XRD after conversion to the porous silicon film 30, showing a peak at 0.75 2θ, corresponding to 12 nm. The (c) line is the low angle XRD after cycling 15×. As seen in (c), the order in the film remains. Both traces show 2nd order peaks at 1.2 and 1.3 2θ indicative of a high degree of order.

Figure 10:
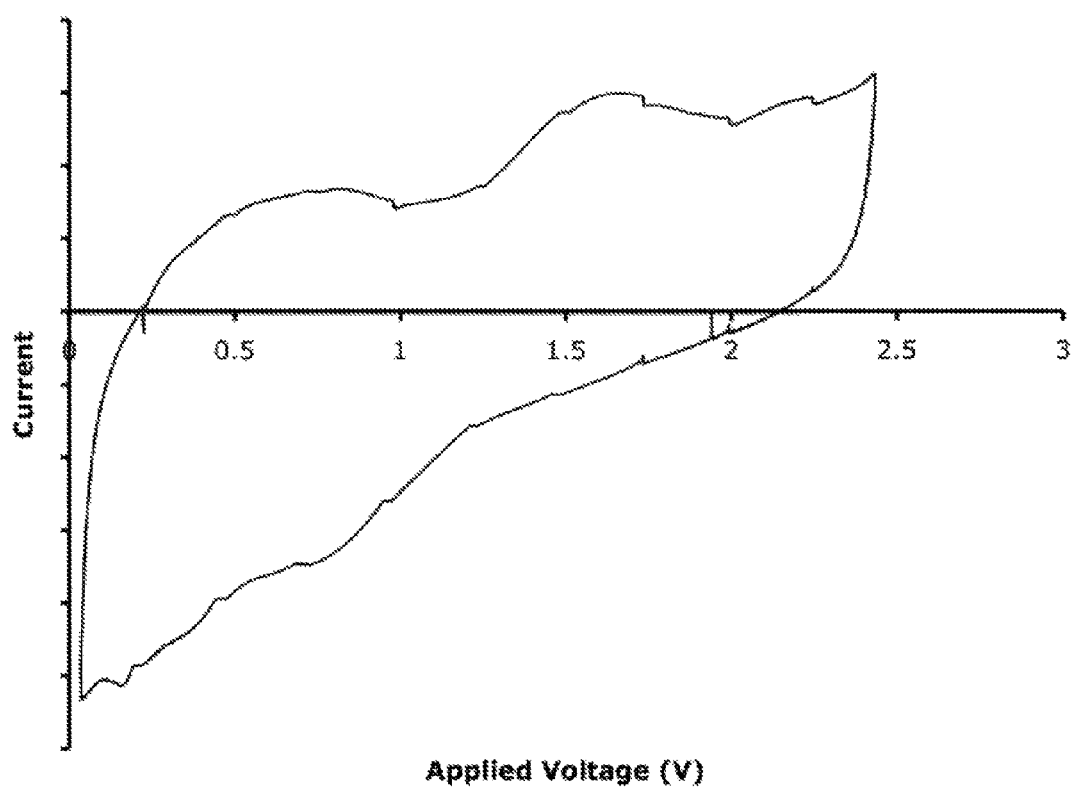
FIG. 10 illustrates the reversible electrochemical cycling of the porous silicon film located on a nickel substrate.
Figure 11:
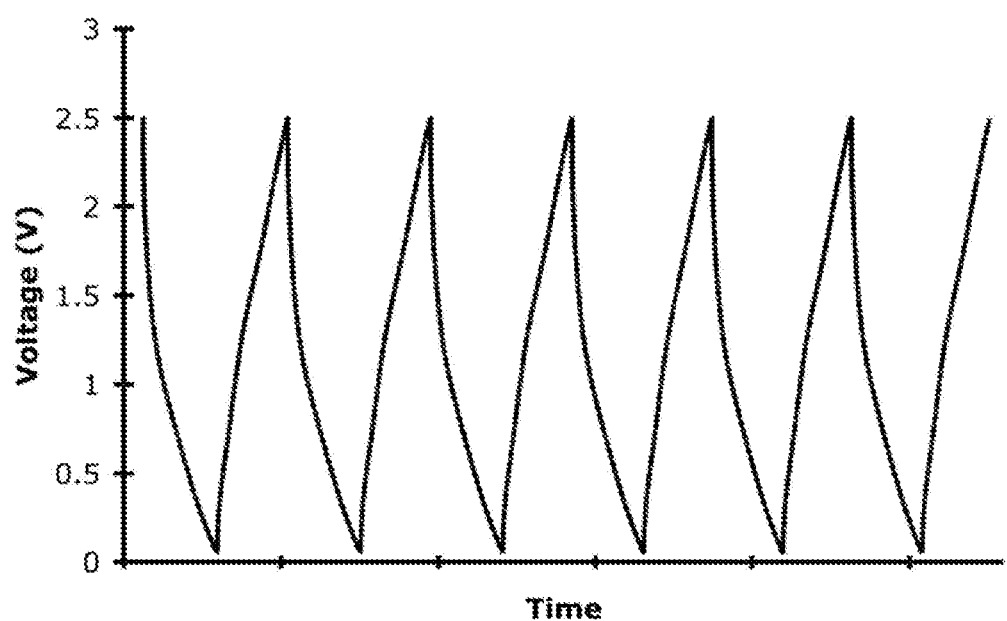
FIG. 11 illustrates the representative galvanostatic charge/discharge curve for the porous silicon film at 50 mA/cm$^2$.

FIG. 10 illustrates the reversible electrochemical cycling of the porous silicon film 30 located on a nickel substrate. The porous silicon film 30 shows a reductive peak beginning at about 1 V ($Li/Li^+$). The porous silicon film 30 has a much broad pair of peaks for the charge/discharge cycling, with one broad Li alloying peak on the reverse of the cycling followed by an equally broad discharge peak for the dealloying process. FIG. 11 illustrates the representative galvanostatic charge/discharge curve for the porous silicon film 30 at 50 $mA/cm^2$.

Figure 12A:
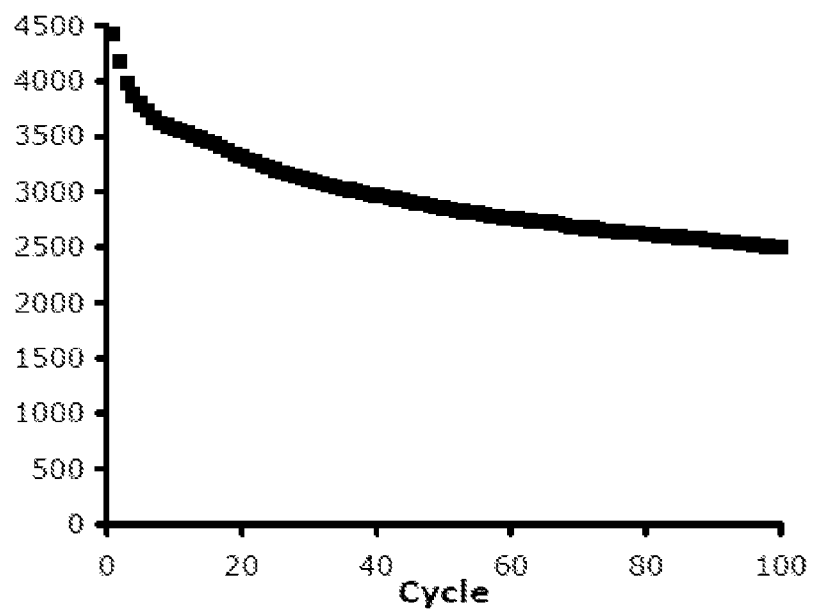
FIG. 12a illustrates the storage capacity of the porous silicon film as a function of cycle number.
Figure 12B:
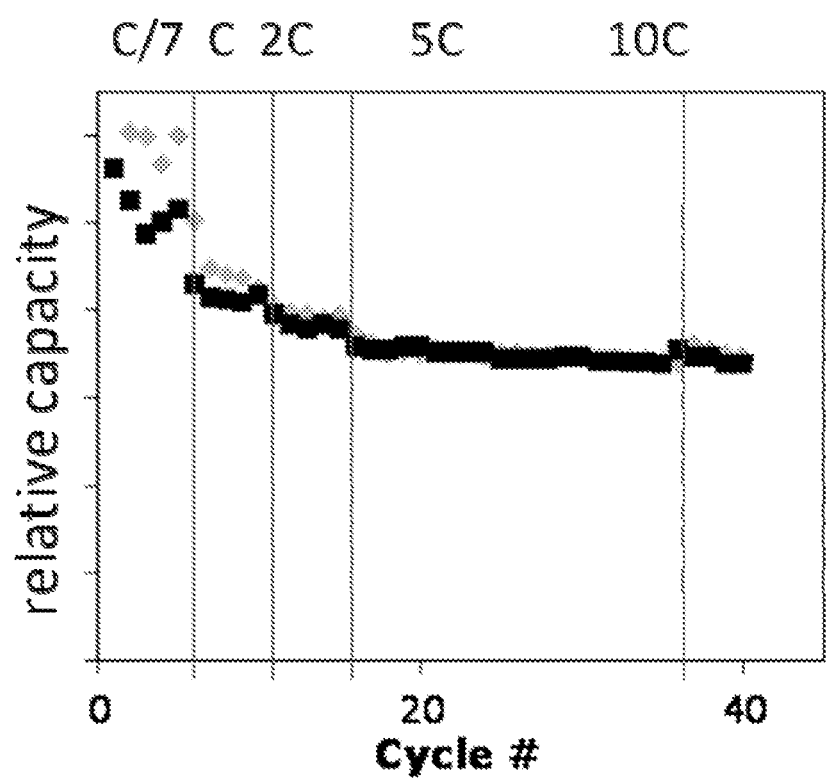
FIG. 12b illustrates the cycling of porous silicon films at varying cycle rates. Rates vary from C/7 to 10 C and relative capacity can be compared. Different shading corresponds to charge and discharge capacity.

FIG. 12a illustrates the storage capacity of the porous silicon film 30 as a function of cycle number. As seen in FIG. 12a, the porous silicon film 30 retains a high capacity even after one hundred cycles (at 1.2 C) with a final specific capacity at around 2500 mAh/g. FIG. 12b illustrates the cycling of porous silicon films 30 at varying cycle rates, between C/7 and 10 C. These porous structures show a stability of capacity over these increasingly fast charging rates with less than a factor of 2 loss in capacity compared to the initial C/7 cycling rate at 10 C indicating that increasing the rate of Li insertion/extraction has little effect on the structure of the material and does not lead to increased fatigue or fracture, as well as the suitability of small dimensional materials for fast charge/discharge properties.

As explained herein, the anode 14 may be formed from a solid matrix of porous silicon in a variety of geometries and shapes. The porous silicon forming the anode 14 may include a single physical structure or, alternatively, a plurality of structures or subunits. For example, the anode 14 may comprise a plurality of porous silicon nanowires 24 removed from the substrate or a plurality of porous silicon films 30. In still another example, the anode 14 may be made from particles or powders 40 (illustrated in FIG. 1e) formed from porous silicon. For example, the anode 14 illustrated in FIG. 1a may be formed from a porous Group IV material such as silicon. In such an embodiment, the powder particles contain nanometer-sized pores and wall thicknesses consistent with those described herein in the context of nanowire and film-based structures. The individual particles that constitute the powder adhere to one another by using a binder material (described in more detail below). Generally, the binder material uses conductive carbon in conjunction with an inert polymer for agglomeration purposes.

The powder is formed from porous silica in a manner equivalent to that used for the template porous silica films 30 described in more detail below or the porous wires described above. Powders of wires are made by methods similar to those described above, with the wires removed from the substrate. For template powders, instead of initially producing a film from a block-copolymer/silica sol, the sol is allowed to form a bulk silica/polymer monolith or powder by evaporation of the solvent. In some cases, the powder can also be induced to precipitate directly from the sol. The powder is then heat treated to crosslink the silica and pyrolize the polymer template. The powder is then subjected to treatment with magnesium vapor to convert the silica to silicon, followed by washing in acid and HF.

To produce an anode 14 from the powder, convention methods are used, including mixing the powder with a binder and a conductive carbon to increase overall conductivity of the powder. The powder can also be ground to reduce the grain size. Cycling behavior of the nanoporous silicon powder should be similar to the behavior seen in polymer template nanoporous silicon films.

Figure 1E:
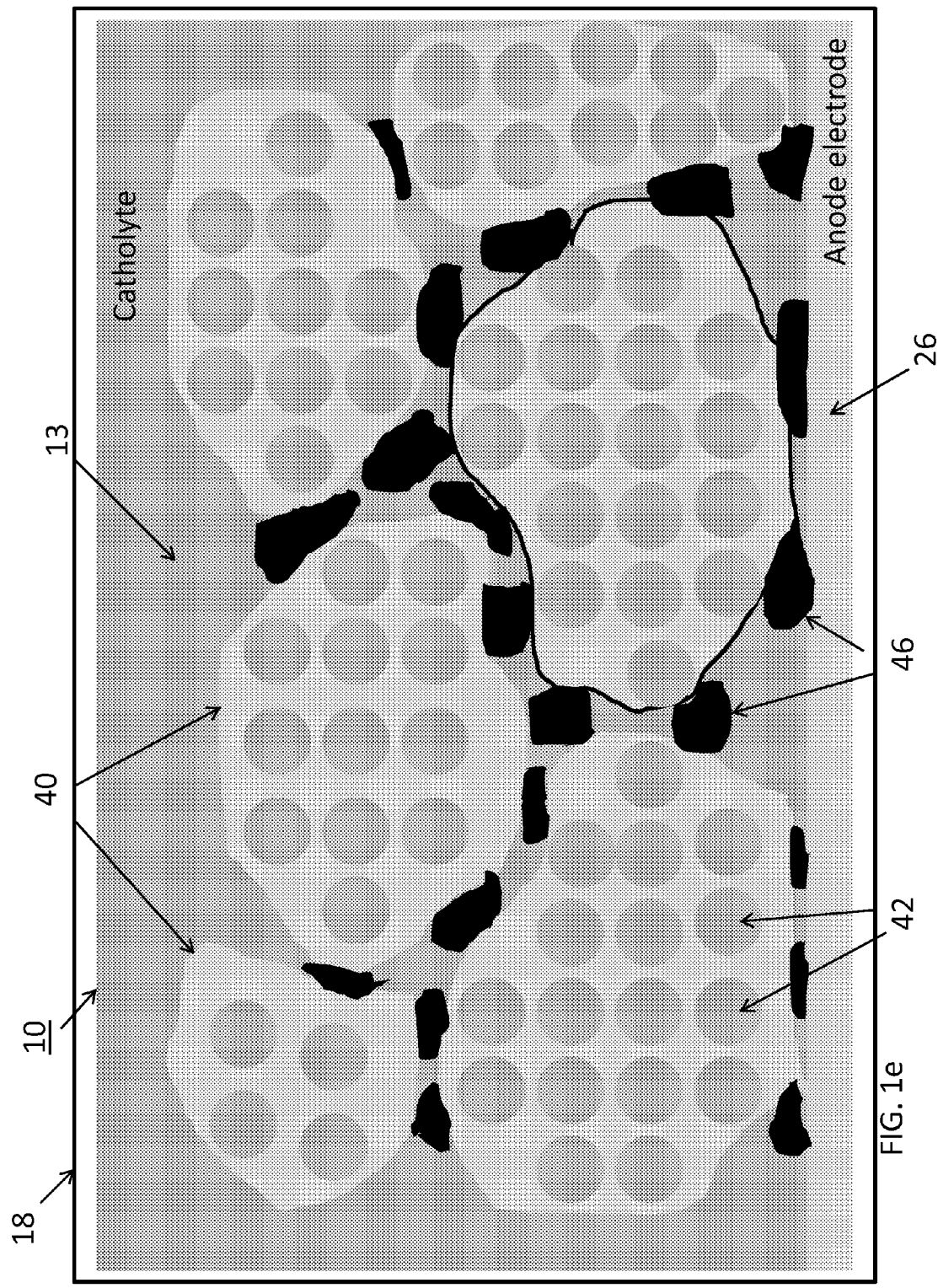
FIG. 1e illustrates a lithium ion battery according to another embodiment that uses a mesoporous silicon powder with binder that is bathed in a catholyte solution.

Another embodiment that can be applied to all forms of porous silicon is the use of a catholyte. The catholyte is a redox active, ionic solution that acts as both the cathode and the electrolyte of the battery, and so no solid electrolyte or separator is needed. One example of a catholyte is lithium polysulfite. FIG. 1c illustrates one such embodiment that uses a catholyte 13 in conjunction with porous silicon nanowires 24. FIG. 1d illustrates another embodiment of a lithium ion battery 10 that uses a catholyte 13 in combination with a porous silicon film 30. FIG. 1e illustrates an embodiment that uses a catholyte 13 in combination with a porous silicon powder 40. In this embodiment, the porous silicon powder 40 contains nanometer-sized pores 42 in the size ranges described herein. The powder 40 is formed by a plurality of particles that are bonded or otherwise adhered to one another through the use of a binder 46. The binder 46 may include carbon black, graphite, and some polymer for example. The powder 40 is immersed or otherwise contained within the catholyte 13 where the catholyte enters the pores 42. The powder 40 may be bonded to a base 26 which may include, for example, an electrically conductive material such as a metal or the like.

As illustrated in FIGS. 1c and 1d, the porous silicon nanowires 24 and the porous silicon films 30 can be contained within or immersed in the catholyte solution 13. Anode materials such as the porous silicon nanowires 24 and the porous silicon films 30 can allow access to all surface through their open pores (e.g., pore 31). Catholytes, surrounding such a high-surface/thin-walled anode materials can have much increased lithium intercalation/de-intercalation rate, due to reduced diffusion distances for lithium.

In still another variation of the anode 14, the porous anode 14 may be optionally coated with a thin oxide coating. Examples of oxides that may be used in connection with the porous anode 14 include alumina, silica, and lithium alumino silicate. Phosphate-based oxides may also be used. These coatings have been applied to other battery electrodes to improve cycle life and increase rate capabilities.

While the various embodiments of the anode 14 specifically described herein utilize porous silicon, it is contemplated that the anode 14 may also be formed from other Group IV semiconductor materials, including, for instance germanium (Ge), and Tin (Sn) in porous form, or combinations or alloys of these elements. Si, Ge, and Sn all show the same basic reactivity with Li, so any porous group IV material should show similar enhancements to those described here for Si. Alloys, in particular, can be helpful in further alleviating strain. Combinations of these Group IV elements with other main group elements are also possible.

The porous silicon nanowires 24 and the porous silicon films 30 can be considered as supercapacitors. As seen in FIG. 7, a fast charge/discharge rate of 48 C falls within a supercapacitor's power region.

While embodiments of the present invention have been shown and described, various modifications may be made without departing from the scope of the present invention. The invention, therefore, should not be limited, except to the following claims, and their equivalents.

What is claimed is:

1. A lithium ion battery comprising:
 a cathode;
 an anode comprising a film of porous silicon disposed adjacent to a current collector, the porous silicon film having a pore diameters within the range between 2 nm and 100 nm and an average wall thickness of within the range between 1 nm and 100 nm, wherein the film of porous silicon is substantially free of any binder material; and
 a non-aqueous lithium containing electrolyte.

2. The lithium ion battery of claim 1, wherein the pore diameters are within the range between 2 nm and 50 nm.

3. The lithium ion battery of claim 1, wherein average wall thickness is within the range between 2 nm and 50 nm.

4. The lithium ion battery of claim 1, wherein the lithium ion battery has a capacity greater than 2000 mAh/g.

5. The lithium ion battery of claim 1, wherein the lithium ion battery has a capacity greater than 2000 mAh/g over a period of more than one hundred charge/discharge cycles.

6. The lithium ion battery of claim 1, wherein the porous silicon retains pore diameters within the range between 2 nm and 100 nm and an average wall thickness of within the range between 1 nm and 100 nm after subject to more than one hundred charge/discharge cycles.

7. The lithium ion battery of claim 1, wherein the film further comprises an oxide layer disposed thereon, the oxide layer comprising one of alumina, silica, lithium alumino silicate, or a phosphate-based oxide.

8. The lithium ion battery of claim 1, wherein the film of porous silicon comprises an ordered mesopore structure.

9. The lithium ion battery of claim 1, wherein the current collector comprises nickel.

\* \* \* \* \*